April 6, 1965    M. MÜLLER ETAL    3,176,598
SHUTTER DIAPHRAGM CONSTRUCTION FOR PHOTOGRAPHIC CAMERAS
Filed July 9, 1962
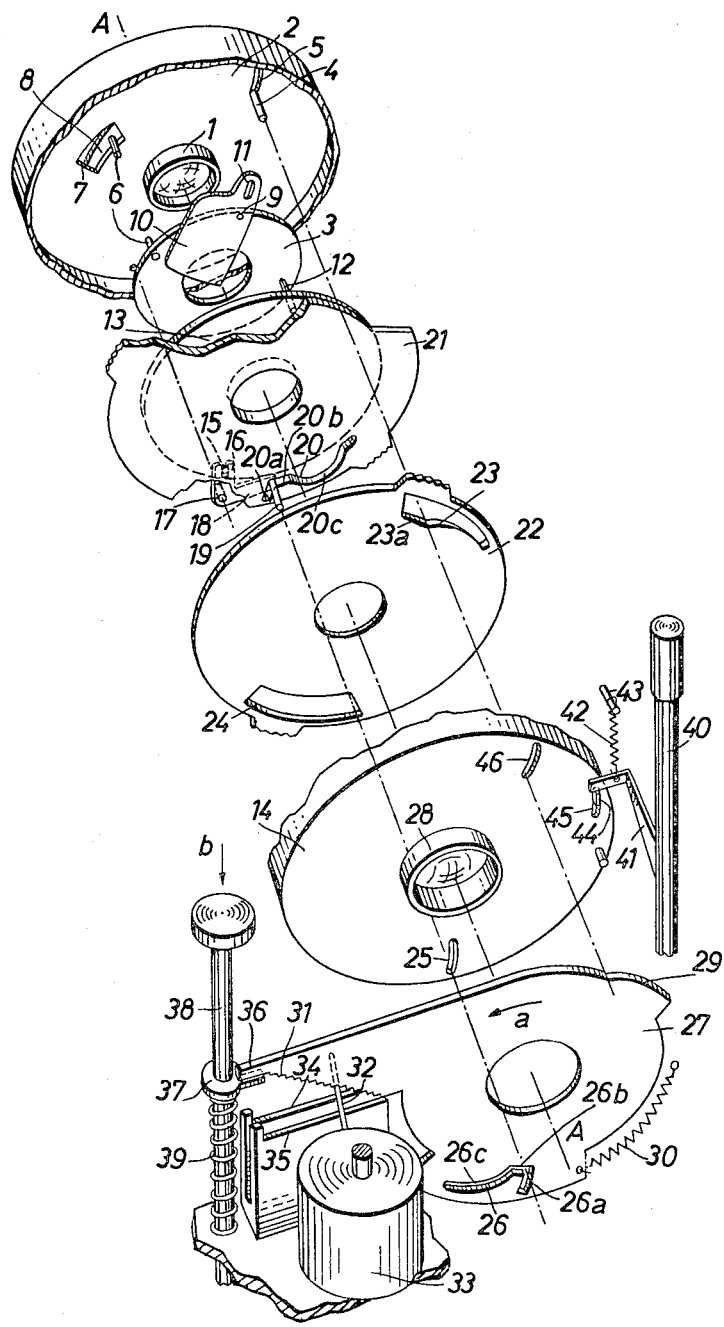
INVENTOR.
MANFRED MÜLLER
WILLI SCHULZ
BY Michael S. Striker
Attorney United States Patent Office 3,176,598
Patented Apr. 6, 1965

3,176,598
SHUTTER DIAPHRAGM CONSTRUCTION FOR
PHOTOGRAPHIC CAMERAS
Manfred Müller, Donaueschingen, and Willi Schulz,
Schwenningen, Germany, assignors to Agfa Aktiengesellschaft, Leverkusen-Bayerwerk, Germany
Filed July 9, 1962, Ser. No. 208,439
Claims priority, application Germany, July 13, 1961,
A 37,868
9 Claims. (Cl. 95—10)

The present invention relates to cameras.

More particularly, the present invention relates to that type of camera wherein a single set of blades are adapted to serve both the function of shutter blades and the function of diaphragm blades.

One of the objects of the present invention is to provide a camera of this type which has an exceedingly simple, uncomplicated construction.

Another object of the present invention is to provide a camera of this type which can have its exposure time and exposure aperture either manually set or automatically set in accordance with the lighting conditions.

Still another object of the present invention is to provide for a camera of the above type manual and automatic setting structure which not only do not conflict with each other in any way but which also do not require any structure for locking the automatic setting structure, for example, against operation when the camera is to be manually set or for locking the manual setting structure against operation when the camera is to be automatically set, so that with the camera of the invention the operator can simply proceed to provide either type of operation without first manipulating structure for locking part of the camera against operation.

With these objects in view the invention includes, in a camera, a plurality of blades which are adapted to act both as shutter blades and diaphragm blades. A pair of rotary ring means are operatively connected to the blades for turning the latter when either one of the pair of ring means turns relative to the other. One of the pair of ring means is a shutter ring means which, when it turns with respect to the other ring means, moves the blades between open and closed positions in order to make an exposure, while the other of the ring means is a diaphragm ring means which is turned with respect to the shutter ring means in order to preset the blades at positions which will provide selected apertures when the blades are moved between their closed and open positions by the shutter ring means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which one possible embodiment of a structure according to the invention is illustrated in an exploded, perspective view.

Referring to the drawing, there is indicated a stationary tube 1 which carries the lenses of the objective and which is supported by a stationary plate 2 of the shutter housing. A shutter ring means in the form of a rotary ring 3 is supported for rotary movement by the stationary tube 1 which is surrounded by the ring 3. At the side of the plate 2 which is not visible in the drawing is located, in a well known manner, a driving mechanism for driving the shutter between its open and closed position as well as a retarding mechanism which is connected to this driving mechanism in a manner well known in the art for determining the exposure time. The retarding mechanism includes an exposure-time setting means in the form of an elongated pin 4 which extends parallel to the optical axis through an elongated slot 5 formed in the wall 2. Furthermore, the shutter ring means 3 is fixed to an elongated pin 6 which also extends parallel to the optical axis, and this pin 6 extends through an opening 7 of the wall 2. The end of the pin 6 distant from the shutter ring means 3 is fixed to a driving member 8 which is driven by the shutter driving structure and forms part of the shutter driving structure so that when the member 8 moves the ring 3 will be turned for opening and closing the shutter in a manner well known in the art. The structure for driving the ring 3 in order to open and close the shutter and the structure for setting the retarding mechanism so as to determine the exposure time do not form part of the present invention.

A plurality of blades 10 are provided, and only one of these blades 10 is shown in the drawing for the sake of clarity. These blades 10 are adapted to act both as shutter blades and as diaphragm blades, and the several blades 10 of course overlap each other and are distributed about the optical axis. The several blades 10 are respectively connected to pins 9 which are in turn carried by the ring 3 so that in this way the several blades 10 are respectively pivotally connected to the ring 3 for turning movement with respect thereto. Furthermore, each of the blades 10 is formed with a slot 11, and the several slots 11 respectively receive pins 12 which are respectively fixed to a rotary ring means 13 which is also turnable about the optical axis, which is coaxial with the ring 3, and which forms a diaphragm ring means for presetting the blades 10 at positions which will provide preselected exposure apertures when the blades 10 are actuated by the shutter ring means 3 for opening and closing the shutter in order to make an exposure. The diaphragm ring means 13 may also be supported for rotary movement by the tube 1, and the pair of ring means 3 and 13 are thus operatively connected to the blades 10 which have a pivotal connection through the pins 9 with the ring 3 and a pin-and-slot connection through the pins 12 and slots 11 with the ring 13. Thus, when the ring 3 turns with respect to the ring 13 the blades 10 will turn, and also when the ring 13 turns with respect to the ring 3 the blades 10 will turn.

The diaphragm ring means 13 fixedly carries a pin 15 which extends parallel to the optical axis and which is received in the bifurcated end portion 16 of a two-armed lever or bell crank 18 which is supported for turning movement by a stationary pin 17 which is fixedly carried by the wall 2, the pin 17 being located at a further distance from the optical axis than the outer periphery of the ring 3. The end of the lever 18 distant from its end portion 16 fixedly carries a pin 19 which also extends parallel to the optical axis, and this pin 19 extends through an elongated camming slot 20 which is formed in a rotary ring 21 the outer periphery of which is accessible to the operator, this rotary ring 21 forming a manually operable diaphragm adjusting ring, as will be apparent from the description which follows.

A second manually turnable ring 22 is supported for rotary movement about the optical axis, and this manually turnable ring 22 serves to adjust the exposure-time setting means 4. Thus, the ring 22 whose outer periphery is also accessible to the operator is formed at its upper right portion, as viewed in the drawing, with an elongated cutout the lower edge of which forms a camming edge 23 engaged by the pin 4, so that the exposure-time setting means formed by the pin 4 can be adjusted by turning of the ring 22. The manually turnable exposure-time setting ring 22 is also formed with an arcuate cutout 24 through which the pin 19 of the lever 18 extends, and the size of the cutout 24 is such that in all positions of the ring 22 and the pin 19 these elements will not interfere with each other. The shutter housing includes a rear wall 14 formed with slots 46 and 25 through which the pins 4 and 19 respectively extend. The rear wall 14 of the shutter housing fixedly carries a tube 28 which also supports part of the lens structure of the objective, and the tubes 1 and 28 cooperate to support the several rings described above for rotary movement. In addition, the portion of the tube 28 which extends rearwardly from the wall 14 extends through a central opening of an automatic adjusting ring means 27 to support the latter ring means for rotary movement about the optical axis which passes through the center of the ring means 27. The automatic rotary adjusting ring means 27 is provided with a camming edge portion 29 which is also engaged by the pin 4 so that the turning of the ring 27 may also be used to adjust the exposure-time setting means 4. An elongated spring 30 is connected at one end to the ring 27 and at its opposite end to a stationary part of the camera, so that the spring 30 urges the ring 27 to turn in the direction of the arrow a indicated in the drawing. A scanning means is connected integrally with the ring 27 for turning movement therewith, and this scanning means includes the elongated, toothed scanning edge 31. A light-responsive means is provided for measuring the light intensity, and part of this light-responsive means includes the meter 33 which may be in the form of a galvanometer connected, for example, to a photocell, and the meter 33 includes a pointer 32 which thus assumes angular positions in accordance with the lighting conditions, as is well known in the art. The scanning edge 31 is adapted to engage the pointer 32 for providing an angular position for the ring 27 which corresponds to the lighting conditions. The pointer 32 of the meter 33 is free to move over a pair of stationary vertical plates 34 and 35 whose upper edges are located closely adjacent to the pointer 32 so that when this pointer is engaged by the scanning edge 31 the pointer 32 will be deflected through only a very slight distance against the upper edges of the plates 34 and 35 so that in this way these plates protect the pointer 32 from the engagement with the scanning edge 31, and in this way the meter 33 is also protected. The position of the plates 34 and 35 is such that the elongated portion of the ring 27 which is provided with the scanning edge 31 can move freely in the space between the plates 34 and 35.

The elongated scanning means which is integral with the ring 27 terminates in a free end portion 36 which engages a collar 37 which is fixed to a vertically movable plunger 38 accessible to the operator, and a spring 39 surrounds the plunger 38 and urges the latter upwardly to the rest position shown in the drawing where the scanning edge 31 is spaced above the pointer 32 so that the latter can assume whatever positions are dictated by the lighting conditions. The spring 39 is of course stronger than the spring 30, and when the plunger 38 is in its illustrated rest position it maintains the ring 27 in the illustrated rest position thereof.

In order to trip the shutter so as to make an exposure there is also provided a vertically movable plunger 40 which is accessible to the operator and which fixedly carries an arm 41 to which is connected a spring 42 which is also connected to a stationary pin 43, so that the spring 42 urges the shuter-tripping plunger 40 upwardly to the illustrated rest position thereof. The arm 41 engages a lug 44 which is connected in a well known manner to the shutter driving structure for tripping this structure after the shutter has been cocked so that the shutter will be released to make an exposure when the plunger 40 is depressed by the operator. The lug 44 forms part of a lever carried by the wall 14 for tripping and and releasing the shutter drive mechanism, and the lug 44 extends through the slot 45 which is formed in the rear wall 14 of the shutter housing.

In order to provide automatic setting of the exposure time and exposure aperture the manually turnable rings 21 and 22, which cooperate with unillustrated scales of apertures and exposure times, are placed in the illustrated positions where they also cooperate with suitable symbols indicating the settings of the rings 21 and 22 when the camera is to be automatically set. The scales with which the rings 21 and 22 cooperate may be stationary while these rings may carry indexes which respectively cooperate with these scales. Thus, the rings 21 and 22 are illustrated in the positions to which they are respectively moved when it is desired to provide automatic setting of the camera. In this position, the exposure-time setting means 4 is located at the region 23a of the camming edge 23, and the pin 19 of the lever 18 is located at the upper end of the radial slot portion 26a of the slot 26 which is formed in the ring 27 and which receives the pin 19. In order to automatically set the camera the operator will now depress the plunger 38 in opposition to the spring 39 in the direction of the arrow b shown in the drawing. As a result the spring 30 can turn the adjusting ring means 27 in the direction of the arrow a, and this turning of the ring 27 will continue until the scanning edge 31 engages the pointer 32 which of course has a position determined by the lighting conditions. In this way the angular position of the ring 27 is also set in accordance with the lighting conditions.

During the turning of the ring 27 in the direction of the arrow a until its scanning edge 31 engages the pointer 32, the camming edge 29 moves the pin 4 so as to set the exposure time, and during this time the pin 4 is free to move along the slot 46 as well as in the cutout of the ring 22 whose lower edge forms the camming edge 23. In this way the ring 27 serves to adjust the exposure-time setting means 4. Moreover, the turning of the ring 27 until its scanning edge 31 engages the pointer 32 causes the relatively short slot portion 26b to become displaced with respect to the pin 19 whereupon the slot portion 26c moves with respect to the pin 19. The curvature of the camming slot portion 26c is such that it will displace the pin 19 away from the optical axis radially along the slot portion 20a of the ring 21, and of course the cutout 24 is large enough so that the pin 19 can move freely without interference at this time. This movement of the pin 19 in response to turning of the ring 27 in the direction of the arrow a will cause the lever 18 to turn in a clockwise direction, as viewed in the drawing, with the result that the turning of the ring 27 will be transmitted through the lever 18 and the pin-and-slot connection 15, 16 to the diaphragm ring means 13 for turning the latter in a counterclockwise direction, as viewed in the drawing. Bearing in mind that the shutter ring means 3 remains stationary at this time, it is clear that the turning of the diaphragm ring means 13 with respect to the shutter ring means 3 will cause the several blades 10 to turn about their pivots 9 so that in this way the blades 10 are preset in positions which will provide a selected exposure aperture in accordance with the angular position of the ring 13 when subsequently the ring 3 turns in order to open and close the shutter. The several blades 10 respectively have a size and configuration which guarantees that the blades 10 extend across the optical axis A—A in all of the possible positions of adjustment which can be provided by the ring 13 so that irrespective of the presetting of the blades 10 by the ring 13 the blades 10 will never provide during setting by the ring 13 an opening through which the film can be exposed. Thus, the depression of the plunger 38 by the operator will result automatically in simultaneous setting of the exposure time and exposure aperture at settings which will be in accordance with the lighting conditions. After the operator has depressed the plunger 38 the operator can depress the plunger 40 in order to trip the shutter and thus make the exposure, and of course the operator maintains the plunger 38 in its depressed condition when the plunger 40 is depressed. The depression of the plunger 40 will move the lug 44 along the slot 45 so as to trip the shutter in a manner well-known in the art, and the result is that the pin 6 will be driven by the shutter driving structure, this shutter driving structure being retarded in accordance with the setting of the pin 4. The shutter driving structure drives the shutter ring means 3 first in the direction of the arrow $a$ so as to turn the blades 10 to a position providing the opening through which the exposure is made and subsequently the shutter drive means in a manner well-known in the art returns the ring 3 in the opposite direction back to its starting position so as to displace the blades 10 for closing the shutter. In this way the exposure is made. It should be noted that the ring 3 is always driven by the shutter driving structure through the same angle back and forth in order to actuate the blades 10 for opening and closing the shutter. On the other hand, the size of the opening provided by the blades 10 is determined by the presetting of these blades 10 in accordance with the adjustment derived from the ring 13. The size and configuration of the several blades 10 is such that in accordance with the preset angular positions derived from the ring 13 the opening formed by the blades 10 when they are actuated by the shutter ring 3 will be larger or smaller in accordance with the extent to which the ring 13 is turned, so that in this way the several blades 10 are capable of acting both as shutter blades and as diaphragm blades.

When the plungers 38 and 40 are released by the operator, the springs 39 and 42 respectively return these plungers to their starting positions, and of course the collar 37 acts on the end 36 of the scanning means to return the ring 27 in opposition to the spring 30 to its starting position, and in this way the pins 4 and 19 are also returned to their starting positions, and of course the position of the arm 41 of the plunger 40 is such that the shutter can again be cocked preparatory to making the next exposure.

In order to provide a manual setting of the camera it is only necessary for the operator to turn the rings 21 and 22 so as to provide the selected exposure aperture and exposure time. This operation of the rings 21 and 22 does not require any action on the part of the operator with respect to the automatic adjusting ring means 27. This ring means 27 simply remains at this time in its rest position shown in the drawing. The rings 21 and 22 are simply turned until the indexes carried thereby are positioned with respect to the stationary scales so as to provide the selected aperture and exposure time. During the turning of the diaphragm setting ring 21 the relatively short portion 20$b$ of the camming slot 20 will first become displaced with respect to the pin 19 and thereafter the curved camming slot portion 20$c$ will engage the pin 19 so as to displace the latter at this time along the radial slot portion 26$a$ of the ring 27 which remains in the illustrated position, and of course the pin 19 at this time also moves along the slot 25 and transversely of the cutout 24. The relatively short slot portion 20$b$ corresponds to the relatively short slot portion 26$b$, and it will be noted that the camming slots 20 and 26 are substantially similar in configuration but extend in opposite directions. In fact, the pair of diaphragm adjusting rings 27 and 21 are turned respectively in opposite directions to provide the same settings for the diaphragm. Thus, assuming that in the rest position the diaphragm will have its largest opening and that this opening will be gradually reduced, then it is clear that when the ring 27 turns in the direction of the arrow $a$ the pin 19 will be acted upon to turn the ring 13 for reducing the size of the exposure aperture, while when the pin 21 turns in the opposite direction, which is to say in a clockwise direction as viewed in the drawing, the camming slot 20 will cooperate with the pin 19 also to turn the ring 13 for reducing the size of the exposure aperture. Of course, it is to be understood that this is only by way of example and in the actual construction it may well be that in the rest position of the ring 13 the smallest aperture is provided and this ring 13 is turned so as to increase the size of the aperture. Thus, it will be seen that the rings 21 and 27 are constructed so as to respectively turn in opposite directions for providing the same settings of the ring 13. Of course, the displacement of the pin 19 by the camming slot 20 will turn the lever 18 which will act through the pin-and-slot connection 15, 16 on the ring 13 for turning the latter so as to turn the several blades 10 in order to preset the latter so as to provide the selected aperture when the blades 10 are moved to their open position by the shutter ring 3. In order to manually set the exposure time the operator will turn the ring 22 in the direction of the arrow $a$, and as a result the camming edge portion 23 will cooperate with the pin 4 in order to set the latter, and in this way the exposure-time setting means formed by the pin 4 will be adjusted in accordance with the angular position of the ring 22. Thus, the pin 4 will be displaced along the slot 5 so as to determine the extent to which the shutter driving structure will be retarded. It will be noted that the pin 4 when moved by the camming edge 23 along the slot 5 simply moves away from the ring 27 and is uninfluenced by the camming edge 29 thereof.

After the camera has been manually set in this manner, the operator will again depress the plunger 40 so as to trip the shutter and make the exposure. In order to again provide an exposure with automatic setting of the camera the operator need only return the rings 21 and 22 to their illustrated positions where their indexes are respectively aligned with suitable symbols indicating the positions of these rings for automatic operation, and then the operator can depress the plunger 38 in order to automatically set the camera in the manner described above.

It will be understood that each of the elements described above, or two or more together, may also find a useful application in other types of cameras differing from the types described above.

While the invention has been illustrated and described as embodied in shutter-diaphragm assemblies for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a plurality of blades adapted to act both as shutter blades and diaphragm blades; rotary diaphragm ring means and rotary shutter ring means operatively connected to said blades for turning said blades when either one of said ring means turns relatively to the other ring means, said shutter ring means turning said blades between open and closed positions while said diaphragm ring means remains stationary and said diaphragm ring means turning said blades while said shutter ring means remains stationary, said diaphragm ring means being turnable before operation of said shutter ring means to preset said blades at positions which will provide a preselected aperture when said shutter ring means operates to move said blades between open and closed positions to make an exposure, said blades having a size and configuration which maintains said blades in a closed position irrespective of the presetting of said blades by said diaphragm ring means.

2. In a camera, in combination, a plurality of blades adapted to act both as shutter and as diaphragm blades; diaphragm ring means and shutter ring means operatively connected to said blades for turning the latter when either one of said ring means turns relative to the other, said diaphragm ring means being turnable for setting said blades at positions which will provide selected apertures and said shutter ring means turning to drive said blades between open and closed positions to make an exposure; exposure-time setting means; and adjusting ring means operatively connected with said diaphragm ring means for adjusting the latter and having a camming portion cooperating with said exposure-time setting means for adjusting the latter.

3. In a camera, in combination, a plurality of blades adapted to act both as shutter and as diaphragm blades; diaphragm ring means and shutter ring means operatively connected to said blades for turning the latter when either one of said ring means turns relative to the other, said diaphragm ring means being turnable for setting said blades at positions which will provide selected apertures and said shutter ring means turning to drive said blades between open and closed positions to make an exposure; exposure-time setting means; adjusting ring means operatively connected with said diaphragm ring means for adjusting the latter and having a camming portion cooperating with said exposure-time setting means for adjusting the latter; light-measuring means for measuring the light intensity; and scanning means connected with said adjusting ring means for scanning said light-measuring means to determine an angular position of said adjusting ring means in accordance with the lighting conditions, so that said adjusting ring means will set said diaphragm ring means and said exposure-time setting means according to the light measured by said light-measuring means.

4. In a camera as recited in claim 3, said light-measuring means including an electrical instrument having a pointer which assumes positions in accordance with the lighting conditions and said scanning means including an elongated portion of said adjusting ring means which has a scanning edge which engages said pointer for determining the angular position of said adjusting ring means in accordance with the lighting conditions.

5. In a camera, in combination, a plurality of blades adapted to act both as diaphragm and as shutter blades; rotary shutter ring means and coaxial rotary diaphragm ring means both operatively connected to said blades for turning the latter when one of said ring means turns relative to the other, said shutter ring means turning said blades between open and closed positions and said diaphragm ring means presetting said blades at positions which will provide a preselected aperture when said shutter ring means turns said blades between open and closed positions; a lever turnable about a stationary axis and having a pin-and-slot connection with said diaphragm ring means at one end portion of said lever; a pin fixed to another end portion of said lever; and an adjusting ring means coaxial with said shutter and diaphragm ring means and having a camming slot receiving said pin for turning said lever in response to turning of said adjusting ring means so as to turn said diaphragm ring means in response to turning of said lever to positions which will preset said blades to provide preselected apertures.

6. In a camera, in combination, a plurality of blades adapted to act both as diaphragm and as shutter blades; rotary shutter ring means and coaxial rotary diaphragm ring means both operatively connected to said blades for turning the latter when one of said ring means turns relative to the other, said shutter ring means turning said blades between open and closed positions and said diaphragm ring means presetting said blades at positions which will provide a preselected aperture when said shutter ring means turns said blades between open and closed positions; a lever turnable about a stationary axis and having a pin-and-slot connection with said diaphragm ring means at one end portion of said lever; a pin fixed to another end portion of said lever; and a pair of coaxial rotary adjusting ring means respectively formed with camming slots which receive said pin so that when either of said adjusting ring means is turned the camming slot thereof will act on said pin to turn said lever and thus turn said diaphragm ring means for presetting said blades at positions to provide a preselected aperture, one of said adjusting ring means being manually turnable for providing manual selection of an exposure aperture and the other of said ring means being adapted to be automatically turned in accordance with the lighting conditions to provide automatically a diaphragm aperture corresponding to the lighting conditions.

7. In a camera, in combination, a plurality of blades adapted to act both as diaphragm and as shutter blades; rotary shutter ring means and coaxial rotary diaphragm ring means both operatively connected to said blades for turning the latter when one of said ring means turns relative to the other, said shutter ring means turning said blades between open and closed positions and said diaphragm ring means presetting said blades at positions which will provide a preselected aperture when said shutter ring means turns said blades between open and closed positions; a lever turnable about a stationary axis and having a pin-and-slot connection with said diaphragm ring means at one end portion of said lever; a pin fixed to another end portion of said lever; and a pair of coaxial rotary adjusting ring means respectively formed with camming slots which receive said pin so that either of said adjusting ring means is turned the camming slot thereof will act on said pin to turn said lever and thus turn said diaphragm ring means for presetting said blades at positions to provide a preselected aperture, one of said adjusting ring means being manually turnable for providing manual selection of an exposure aperture and the other of said ring means being adapted to be automatically turned in accordance with the lighting conditions to provide automatically a diaphragm aperture corresponding to the lighting conditions, the camming slot of each adjusting ring having a portion along which said pin is freely movable when said pin is moved by the camming slot of the other ring, and said camming slot portions of said pair of adjusting ring means respectively extending in opposite directions for providing the same adjustment of said diaphragm ring means when said pair of adjusting ring means respectively turn in opposite directions.

8. In a camera, in combination, a plurality of blades adapted to act both as shutter blades and as diaphragm blades; shutter ring means and diaphragm ring means operatively connected to said blades for turning the latter when either one of said ring means turns relative to the other, said shutter ring means being operatively connected to said blades for turning the latter between open and closed positions to make an exposure and said diaphragm ring means being operatively connected to said blades for presetting the latter at preselected positions which will provide a selected exposure aperture when said blades are moved between their open and closed positions by said shutter ring means; exposure-time setting means; first manually turnable ring means operatively connected to said exposure-time setting means for manually setting the latter to provide a selected exposure time; and second manually turnable ring means operatively connected to said diaphragm ring means for angularly setting the latter to provide a manually selected exposure aperture.

9. In a camera, in combination, a plurality of blades adapted to act both as shutter blades and as diaphragm blades; shutter ring means and diaphragm ring means operatively connected to said blades for turning the latter when either one of said ring means turns relative to the other, said shutter ring means being operatively connected to said blades for turning the latter between open and closed positions to make an exposure and said diaphragm ring means being operatively connected to said blades for presetting the latter at preselected positions which will provide a selected exposure aperture when said blades are moved between their open and closed positions by said shutter ring means; exposure-time setting means;

first manually turnable ring means operatively connected to said exposure-time setting means for manually setting the latter to provide a selected exposure time; second manually turnable ring means operatively connected to said diaphragm ring means for angularly setting the latter to provide a manually selected exposure aperture; automatic adjusting ring means operatively connected both to said exposure-time setting means and to said diaphragm ring means for setting both the exposure time and the exposure aperture upon turning of said automatic adjusting ring means; and means cooperating with the latter ring means for automatically determining the angular position thereof in accordance with the lighting conditions.

References Cited by the Examiner
UNITED STATES PATENTS

| | | | |
|---|---|---|---|
| 3,056,340 | 10/62 | Kiper | 95—10 |
| 3,089,400 | 5/63 | Kiper | 95—63 |
| 3,095,790 | 7/63 | Gebele et al. | 95—64 X |
| 3,121,380 | 2/64 | Millhouse | 95—64 |

EVON C. BLUNK, *Primary Examiner.*

EMIL G. ANDERSON, *Examiner.*